UNITED STATES PATENT OFFICE.

JOHN H. LONG, OF CHICAGO, ILLINOIS, ASSIGNOR TO CHISHOLM, BOYD, AND WHITE COMPANY, A CORPORATION OF ILLINOIS.

PROCESS OF BRIQUETING IRON-BEARING SUBSTANCES.

SPECIFICATION forming part of Letters Patent No. 711,060, dated October 14, 1902.

Application filed July 21, 1902. Serial No. 116,339. (No specimens.)

*To all whom it may concern:*

Be it known that I, JOHN H. LONG, a citizen of the United States, residing in the city of Chicago, county of Cook, State of Illinois, have invented a new and useful Improvement in Processes of Briqueting Iron-Bearing Substances, of which the following is a specification.

My invention relates to processes of briqueting iron-bearing substances—for example, flue-dust and pulverized iron-bearing ores.

A common failing of the briquets heretofore manufactured is that they absorb moisture from the atmosphere, and as a result soon after the completion of manufacture become cracked and weakened to such an extent as to be undesirable and frequently unavailable for smelting.

The object of this invention is to produce briquets by the aid of commercial common salt, which briquets will not absorb moisture and which will permanently retain the strength and toughness possessed at the time of completion of manufacture.

I have found that a non-absorptive briquet may be obtained by using pure sodium chlorid as a bond by dissolving the sodium chlorid in water and mixing the brine thus obtained and iron-bearing substance together in such proportion that the final mixture will contain five or six parts, by weight, of salt to ninety-five or ninety-four parts, respectively, of iron-bearing substance. The mixture is then compressed and dried and the resulting briquets will be non-absorptive. Sodium chlorid, however, is too expensive to be used commercially for this purpose. The common salt of commerce can be economically used in the production of such briquets; but such commercial salt contains calcium chlorid, a substance which attracts moisture from the atmosphere. When such briquets are made by the use of the ordinary commercial salt to form a bond for the iron-bearing substance, the briquets thus formed will on account of the presence of such calcium chlorid attract moisture from the atmosphere, and thus become weakened and liable to disintegrate and crumble.

To bring a non-absorptive briquet by the aid of commercial salt, procedure is had in the following manner: Commercial salt is first dissolved in, preferably, hot water in the proportion of approximately one pound of salt to two pounds of water. Sodium carbonate, commonly called "soda" or "soda-ash," is then mixed with the brine in the proportion of approximately ten pounds of sodium carbonate to six thousand pounds of brine. This gives a proportion of ten pounds of soda to one ton of salt. The brine thus treated or corrected with soda is then mixed with the pulverized flue-dust, iron ore, or other iron-bearing substance in such proportion that for every ninety-five pounds of iron-bearing substance there will be approximately fifteen pounds of treated brine. The combined salt and soda will therefore constitute about five per cent. of the composition of the final mixture. The precise method of mixing the bonding ingredients with the iron-bearing substance is not essential; but the type of machine known in the art as a "conveyer-mixer" is well adapted for this purpose. The final mixture is then pressed into form by suitable pressing devices, and the resulting briquets are subsequently dried. Suitable machines for pressing the material are shown in the patents to B. C. White, issued March 8, 1898, No. 600,188, for molding apparatus, and December 27, 1892, No. 488,622, for brick-machines. The best manner of drying the briquets is by placing them in a receptacle heated to a temperature of from 200° to 300° Fahrenheit. After being subjected to this heat for a suitable period of time the briquets become thoroughly "set" and are of such hardness that they will withstand sharp blows from a hand-hammer. When fractured, these briquets present a clean hard surface of cleavage and exhibit a reddish color both inside and outside, which indicates the corrosion or rust of the iron particles.

Briquets formed by my process are substantially impervious to atmospheric moisture, do not swell or crack, and will last for an indefinite period without apparent deterioration or loss of strength.

The coöperation and reaction of the component parts of the briquets when produced by my process are probably as follows:

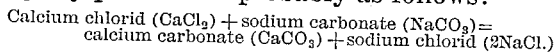
Calcium chlorid (CaCl$_2$) + sodium carbonate (NaCO$_3$) = calcium carbonate (CaCO$_3$) + sodium chlorid (2NaCl.)

The resulting calcium carbonate, which is virtually the same as limestone, is insoluble, and the resulting sodium chlorid does not attract moisture. There is also a reaction between the sodium chlorid and the iron particles during the final mixing and drying, with the result that the iron particles become rusted together.

In this specification the term "briquet" signifies iron-bearing material pressed into form and has no reference to configuration nor to the particular machine whereby the pressing is accomplished.

I do not limit myself to the exact proportion of the ingredients as herein given, for it is evident that inasmuch as the ingredients of commercial salt will vary, and the amount and condition of the iron particles in the flue-dust or other iron-bearing substance will likewise vary, it may be necessary to somewhat alter the said proportions of ingredients to suit conditions.

Attention is directed to the companion application filed by me simultaneously herewith for process of briqueting iron-bearing substances, Serial No. 116,338.

What I claim as new, and desire to secure by Letters Patent, is—

1. The process of briqueting consisting of mixing non-deliquescent salt with iron-bearing substance in the presence of moisture, and compressing and finally drying the mixture.

2. The process of briqueting consisting in mixing together soda and commercial common salt in such proportions as to correct the salt and render the same substantially non-deliquescent; then mixing the non-deliquescent salt with iron-bearing substance as a bond therefor, and afterward compressing the mixture.

3. The process of briqueting, consisting in adding sodium carbonate to commercial common salt containing deliquescent ingredients in addition to the sodium chlorid; causing chemical reaction between said sodium carbonate and deliquescent salt by heating the same in the presence of water; then mixing the solution with iron-bearing substance for bonding, and finally compressing and drying the mixture.

4. The process of briqueting consisting in adding soda to commercial common salt in the proportions approximately of one pound of soda to two hundred pounds of salt, and admixing a solution of the salt and soda thus prepared to iron-bearing substance.

5. The process of briqueting, consisting in adding soda to a hot brine composed of commercial common salt dissolved in water, the proportion of said salt to water being approximately one pound of salt to two pounds of water; next mixing said brine with iron-bearing substance; then compressing and finally drying the mixture.

6. The process of briqueting, consisting in producing a brine having one part of commercial common salt to approximately two parts water; then adding soda to the brine to correct the same and render the dissolved solids in the brine substantially non-deliquescent when subsequently dried; next mixing the corrected brine with iron-bearing substance in proper proportion to form a bond; then compressing the mixture; and finally drying the resulting briquets.

7. The process of briqueting, consisting in producing a brine having one part commercial salt to approximately two parts water, adding soda to the brine in the proportion, approximately, of one part soda to two hundred parts salt; next adding the corrected brine to iron-bearing substance in the proportion of approximately fifteen parts of brine to ninety-five parts of iron-bearing substance, then forming the mixture into briquets and finally drying the same.

8. A briquet consisting of iron-bearing substance and non-deliquescent salt mixed together and compressed into form.

9. A briquet consisting of iron-bearing substance bonded by means of commercial common salt and soda, the soda being in sufficient proportion to render the salt non-deliquescent, the briquets being thereby prevented from attracting moisture.

10. A briquet composed of iron-bearing substance, commercial common salt, and soda, the approximate proportions being one part soda to two hundred parts salt, and the iron-bearing substance composing about ninety-five per cent. of the entire mixture.

JOHN H. LONG.

Witnesses:
COLBY M. AVERY,
SADIE WOLF.